United States Patent
Xiong et al.

(10) Patent No.: US 9,402,014 B2
(45) Date of Patent: Jul. 26, 2016

(54) METHOD FOR IMPROVING CLARITY OF PDF FILE CONVERTED FROM PAPER FILE

(71) Applicant: Fujian Foxit Software Development Joint Stock Co., Ltd., Fuzhou (CN)

(72) Inventors: Yuqian Xiong, Fuzhou (CN); Mingjun Lin, Fuzhou (CN)

(73) Assignee: Fujian Foxit Software Development Joint Stock Co., Ltd., Fuzhou (CN)

( * ) Notice: Subject to any disclaimer, the term of this patent is extended or adjusted under 35 U.S.C. 154(b) by 0 days.

(21) Appl. No.: 14/425,791

(22) PCT Filed: Jul. 12, 2013

(86) PCT No.: PCT/CN2013/000844
§ 371 (c)(1),
(2) Date: Mar. 4, 2015

(87) PCT Pub. No.: WO2014/044017
PCT Pub. Date: Mar. 27, 2014

(65) Prior Publication Data
US 2015/0215490 A1 Jul. 30, 2015

(30) Foreign Application Priority Data
Sep. 24, 2012 (CN) .......................... 2012 1 0359819

(51) Int. Cl.
H04N 1/04 (2006.01)
H04N 1/23 (2006.01)
G06T 11/60 (2006.01)

(52) U.S. Cl.
CPC H04N 1/23 (2013.01); G06T 11/60 (2013.01); G06T 2210/22 (2013.01)

(58) Field of Classification Search
CPC ....... H04N 1/23; G06T 11/60; G06T 2210/22
USPC .......................................... 358/1.15, 1.9, 474
See application file for complete search history.

(56) References Cited

U.S. PATENT DOCUMENTS

| 2004/0181754 | A1* | 9/2004 | Kremer | ................ | H04N 1/3873 |
| | | | | | 715/201 |
| 2006/0044605 | A1* | 3/2006 | Schneider | ............ | G06K 9/2063 |
| | | | | | 358/1.15 |

FOREIGN PATENT DOCUMENTS

CN 102254302 11/2011

OTHER PUBLICATIONS

International Search Report of PCT/CN2013/000844 dated Sep. 5, 2013, 4 pages (English and Chinese translations).

*Primary Examiner* — Houshang Safaipour
(74) *Attorney, Agent, or Firm* — Rankin, Hill & Clark LLP

(57) ABSTRACT

The present invention relates to a method for improving clarity of a PDF file converted from a paper file. The method comprises: step 1: scanning a paper file to obtain an electronic image file; step 2: determining a top margin, a bottom margin, a left margin, and a right margin of the electronic image file, and deleting data within the top margin, the bottom margin, the left margin, and the right margin of the electronic image file, and converting a first cropped file into a first PDF file; step 3: dividing the first PDF file into some rectangular objects, determining effective areas of the rectangular objects, and deleting data outside effective areas of the rectangular objects, so as to obtain cropped rectangular objects corresponding to the rectangular objects in a one-to-one manner; and step 4: combining the cropped rectangular objects according to same position distribution of the rectangular objects corresponding to the cropped rectangular objects on the first PDF file, so as to obtain and output a second PDF file. By means of the present invention, clarity of a PDF file converted from a paper file can be improved.

1 Claim, 1 Drawing Sheet

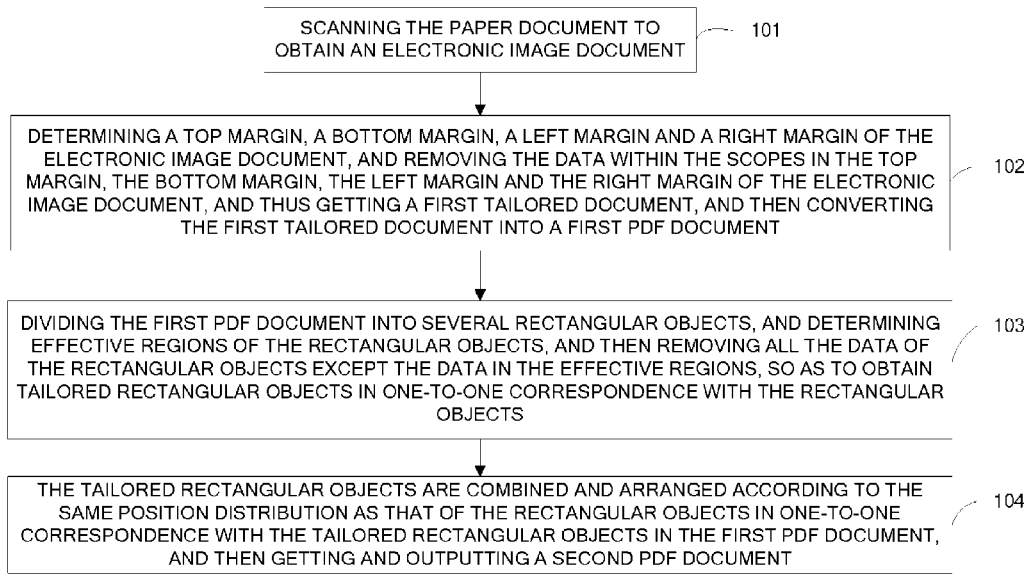

METHOD FOR IMPROVING CLARITY OF PDF FILE CONVERTED FROM PAPER FILE

TECHNICAL FIELD

The present invention relates to the field of improving the clarity of a PDF document converted from a paper document, in particular, to a method for improving the clarity of a PDF document converted from a paper document.

BACKGROUND

"PDF document" is a widely used electronic document. "PDF" is the acronym for "Portable Document Format" and is a format for electronic documents. All the documents in "PDF" format are known as PDF documents.

The PDF document is usually used for converting from a paper document. The process of converting is as follows: firstly scanning the content of the paper document into an electronic image document, and then transforming the data of the electronic image document into a PDF document by means of software(s). Because the electronic image document scanned from the paper document may carry a certain amount of impurity data (i.e., the data not belonging to the original paper document but coming from the scanning process), the impurity data is retained during the process of converting in format and seriously affecting the reading experiences of readers. And then, the clarity of the PDF document converted in the prior art is poor, and the reading experiences of readers are also poor. Therefore, it is easy to damage the eyes of the readers especially when you read them on the small screen of electronic devices (such as mobile phones).

SUMMARY OF THE INVENTION

The technical problem solved by the present invention is to provide a method for improving the clarity of a PDF document converted from a paper document, and then the present invention can improve the clarity of the PDF document converted from the paper document.

The technical solution to solve the above technical problem of the present invention is as follows: a method for improving the clarity of a PDF document converted from a paper document, wherein the method comprises the following steps:

Step 1: scanning the paper document to obtain an electronic image document;

Step 2: determining a top margin, a bottom margin, a left margin and a right margin of the electronic image document, and removing the data within the scopes in the top margin, the bottom margin, the left margin and the right margin of the electronic image document, and thus getting a first tailored document, and then converting the first tailored document into a first PDF document;

Step 3: dividing the first PDF document into several rectangular objects, and determining effective regions of the rectangular objects, and then removing all the data of the rectangular objects except the data in the effective regions, so as to obtain tailored rectangular objects in one-to-one correspondence with the rectangular objects;

Step 4: the tailored rectangular objects are combined and arranged according to the same position distribution as that of the rectangular objects in one-to-one correspondence with the tailored rectangular objects in the first PDF document, and then getting and outputting a second PDF document.

The beneficial effect of the present invention is in that: in the present invention, the electronic image document scanning from the paper document is tailored for the first time, and removed the data within the scopes in the top margin, the bottom margin, the left margin and the right margin, and thus filtered out the invalid data and the impurity data in the above scopes. After the first PDF document is divided into several rectangular objects, the rectangular objects are tailored for the second time, so as to only retain the effective regions of the rectangular objects, and to delete the other data such as the invalid data and the impurity data. Therefore, comparing to PDF documents generated by the prior art, the impurity data are reduced greatly in the second PDF document ultimately generated in the present invention. Furthermore, naturally, the effects of the impurity data on the readable valid data are reduced greatly. Therefore, the present invention greatly improve the clarity of a PDF document converted from a paper document, making the PDF document more suitable for reading, especially more suitable for reading contents arranged on small devices.

On the basis of the technical solution, the present invention may also be made the following improvements:

Further, after the step 3 and prior to the step 4, there is also a step 3-4-1: adding up the pixels of the effective regions of all the tailored rectangle objects to obtain a total sum, so as to get a reading region of the first PDF document.

Further, after the step 3-4-1 and prior to the step 4, there is also a step 3-4-2: taking fault-tolerant processing to the tailored rectangular objects.

BRIEF DESCRIPTION OF THE DRAWINGS

FIG. 1 illustrates a flow chart of a method for improving the clarity of a PDF document converted from a paper document to the present invention.

DETAILED DESCRIPTION OF THE EMBODIMENTS

With reference to the accompanying drawings, the description of the principles and features of the present invention are given as following. The given examples are only applied to explaining the present invention, but not be applied to limit the scope of the present invention.

The present invention provides a method for improving the clarity of a PDF document converted from a paper document, wherein the clarity refers to the degree of the sharpness and clearness of the streaks and stripes of the PDF document and the borders thereof. The less the impurity data on the PDF document are, the better the sharpness and clearness thereof is.

FIG. 1 illustrates a flow chart of a method for improving the clarity of a PDF document converted from a paper document to the present invention. As shown in FIG. 1, the method comprises the following steps:

Step 101: Scanning a paper document to obtain an electronic image document.

The paper document of the present invention can be any document recorded on the sheets or papers such as a books or an album.

This step can use scanners for scanning a paper document.

Step 102: determining a top margin, a bottom margin, a left margin and a right margin of the electronic image document, and removing the data within the scopes in the top margin, the bottom margin, the left margin and the right margin of the electronic image document, and thus getting a first tailored document, and then converting the first tailored document into a first PDF document;

In this step, the top margin, the bottom margin, the left margin and the right margin are respectively similar with the meanings of the top, bottom, left and right margin distances of a commonly used paper document. For example, the top margin of the electronic image document refers to the range between the valid data (i.e., the data which could reflect the content of the paper document) on the top of the electronic image document and the uppermost position of the electronic image document. Obviously, the data within the top margin are all invalid data (i.e., the data irrelevant to the content of the original paper document), and thus it is lossless to remove this part of invalid data with regard to the integrality of the data. Similarly, the bottom margin of the electronic image document refers to the range between the valid data on the bottom of the electronic image document and the lowermost position of the electronic image document. Similarly, the left margin of the electronic image document refers to the range between the valid data on the left of the electronic image document and the leftmost position of the electronic image document. Similarly, the right margin of the electronic image document refers to the range between the valid data on the right of the electronic image document and the rightmost position of the electronic image document. Therefore it is similarly to the description for the top margin, the data within the ranges of the bottom margin, the left margin and the right margin are all invalid data, and it is lossless to remove these parts of invalid data with regard to the integrality of the data.

The format of the first tailored document obtained by removing the invalid data within the scopes of the top margin, the bottom margin, the left margin and the right margin of the electronic image document is the same as the electronic image document, and it is still an image document format in nature. It is necessary to perform format conversion so as to generate a PDF document. In this step, it applies the prior art to convert the first tailored document to the first PDF document, therefore, the details for converting the first tailored document to the first PDF document are not necessarily described herein.

Step 103: dividing the first PDF document into several rectangular objects, and determining effective regions of the rectangular objects, and then removing all the data of the rectangular objects except the data in the effective regions, so as to obtain tailored rectangular objects in one-to-one correspondence with the rectangular objects;

Looking from appearance; the first PDF document is usually set as a rectangle. Therefore, it can be thought of as a combination of a number of rectangular objects together, and thus it can be slimly divided into a number of smaller rectangular objects. Rectangle objects here are generally composed of a plurality of pixels, and the rectangular objects are also rectangular looking from outside, and they are square in special situations.

Each of the rectangular objects can contain a certain amount of valid data and a certain amount of invalid data. Alternatively, each of the rectangular objects can only contain valid data or invalid data. It can be considered: data contained in a rectangle object can be just divided into valid data and invalid data, the range covered by valid data is called the effective region in the present invention, and invalid data is obviously the data besides the effective region of the rectangle object. Thus, in this step, when effective regions of the rectangular objects have been determined, the invalid data can be removed by deleting the data outside the effective regions of the rectangular objects. When the invalid data within the scope in the top margin, the bottom margin, the left margin and the right margin of the electronic image document at step 102 are removed, the proportion of the valid data generated ultimately in the second PDF document can be further increased, and thus the clarity of the second PDF document is improved.

Step 104: the tailored rectangular objects are combined and arranged according to the same position distribution as that of the rectangular objects in one-to-one correspondence with the tailored rectangular objects in the first PDF document, and then getting and outputting a second PDF document.

Because in the step 103 the invalid data in the rectangular objects are deleted, it can be assumed that there is no invalid data or there is barely invalid data, the data set of all tailored rectangular objects is exactly the same as the content in the paper document in the step 101. Thus, in this step, all the tailored rectangular objects are combined into the second PDF document, and the combination method is as follows: According to one-to-one correspondence of the tailored rectangular objects and the rectangular objects in the step 103, the relational positions of the tailored rectangular objects on the second PDF document are set the same as the relational positions of the rectangular objects which corresponding with in one-to-one correspondence with the tailored rectangular objects in the first PDF document. Alternatively, for the special case of rectangular objects being only comprised of invalid data, because the tailored rectangular objects generated by step 103 do not contain any data, and this circumstance is equivalent to completely removing all the data. Therefore, the positions of the tailored rectangular objects in the second PDF document can be set no data.

The second PDF document obtained in this step is derived from the paper document of the step 101, and the sharpness and clearness of the second PDF document is improved relative to the PDF documents in the prior art.

It can be seen that, in the present invention, the electronic image document scanning from the paper document is tailored for the first time, and removed the data within the scopes in the top margin, the bottom margin, the left margin and the right margin, and thus filtered out the invalid data and the impurity data in the above scopes. After the first PDF document is divided into several rectangular objects, the rectangular objects are tailored for the second time, so as to only retain the effective regions of the rectangular objects, and to delete the other data such as the invalid data and the impurity data. Therefore, comparing to PDF documents generated by the prior art, the impurity data are reduced greatly in the second PDF document ultimately generated in the present invention. Furthermore, naturally, the effects of the impurity data on the readable valid data are reduced greatly. Therefore, the present invention greatly improve the clarity of a PDF document converted from a paper document, making the PDF document more suitable for reading, especially more suitable for reading contents arranged on small devices.

Further, after the step 103 and prior to the step 104, there is also a step 103-104-1: adding up the pixels of the effective regions of all the tailored rectangle objects to obtain a total sum, so as to get a reading region of the first PDF document.

Over here, the effective regions of entire rectangular objects are formed by covering of valid data. And, this step determines the reading region of the first PDF document by summing up the pixels of the effective regions of entire rectangular objects. Therefore, the data amount of the second PDF document can be obtained, so as to facilitate download and save.

Further, after the step 103-104-1 and prior to the step 104, there is also a step 103-104-2: taking fault-tolerant processing to the tailored rectangular objects.

In the step of the fault-tolerance process set in the present invention, the data can be received and decoded, and get better visual effects when a part of the data of the second PDF document makes mistake or miss data (such as making mistakes or missing data during the network transmission), thereby the error correction performance of the second PDF document can be improved.

From this, the present invention has the following advantages:

(1) In the present invention, the electronic image document scanning from the paper document is tailored for the first time, and removed the data within the scopes in the top margin, the bottom margin, the left margin and the right margin, and thus filtered out the invalid data and the impurity data in the above scopes. After the first PDF document is divided into several rectangular objects, the rectangular objects are tailored for the second time, so as to only retain the effective regions of the rectangular objects, and to delete the other data such as the invalid data and the impurity data. Therefore, comparing to PDF documents generated by the prior art, the impurity data are reduced greatly in the second PDF document ultimately generated in the present invention. Furthermore, naturally, the effects of the impurity data on the readable valid data are reduced greatly. Therefore, the present invention greatly improve the clarity of a PDF document converted from a paper document, making PDF document more suitable for reading, especially more suitable for reading contents arranged on small devices.

(2) In the step of the fault-tolerance process set in the present invention, the data can be received and decoded, and get better visual effects when a part of the data of the second PDF document makes mistake or miss data (such as making mistakes or missing data during the network transmission), thereby the error correction performance of the second PDF document can be improved.

The above-mentioned are only preferred embodiments of the present invention, and are not intended to limit the present invention. The present invention of any modification, equivalent replacement, improvement, etc. within the spirit and principle, should be deemed to fall within the scope of the present invention.

What is claimed is:

1. A method for improving the clarity of a PDF document converted from a paper document, characterized in that, the method comprises the following steps:

Step 1: scanning the paper document to obtain an electronic image document;

Step 2: determining a top margin, a bottom margin, a left margin and a right margin of the electronic image document, and removing the data within the scopes in the top margin, the bottom margin, the left margin and the right margin of the electronic image document, and thus getting a first tailored document, and then converting the first tailored document into a first PDF document;

Step 3: dividing the first PDF document into several rectangular objects, and determining effective regions of the rectangular objects, and then removing all the data of the rectangular objects except the data in the effective regions, so as to obtain tailored rectangular objects in one-to-one correspondence with the rectangular objects;

Step 4: the tailored rectangular objects are combined and arranged according to the same position distribution as that of the rectangular objects in one-to-one correspondence with the tailored rectangular objects in the first PDF document, and then getting and outputting a second PDF document;

wherein, after the step 3 and prior to the step 4, there is also a step 3-4-1: adding up the pixels of the effective regions of all the tailored rectangle objects to obtain a total sum, so as to get a reading region of the first PDF document;

after the step 3-4-1 and prior to the step 4, there is also a step 3-4-2: taking fault-tolerant processing to the tailored rectangular objects.

* * * * *